Oct. 2, 1951 D. E. MAXWELL 2,570,139

CATHODE-RAY IMAGE PRESENTATION SYSTEM

Filed Jan. 18, 1946 2 Sheets-Sheet 1

Inventor:
Donald E. Maxwell,
by Merton D. Moore
His Attorney.

CATHODE-RAY IMAGE PRESENTATION SYSTEM

Filed Jan. 18, 1946 2 Sheets-Sheet 2

Inventor:
Donald E. Maxwell,
by Merton D. Moore
His Attorney.

Patented Oct. 2, 1951

2,570,139

UNITED STATES PATENT OFFICE 2,570,139

CATHODE-RAY IMAGE PRESENTATION SYSTEM

Donald E. Maxwell, New Canaan, Conn., assignor to General Electric Company, a corporation of New York Application January 18, 1946, Serial No. 641,918

5 Claims. (Cl. 175—183)

Figure 1:
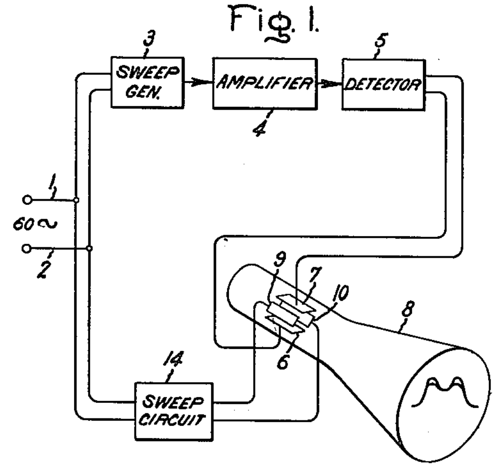

My invention relates to image presentation systems and more particularly to means for superimposing two images on a cathode ray tube.

In presenting images on cathode ray tube screens for the purpose of visually examining the performance of electric circuits, it is often desirable to compare two separate images corresponding to as many separate circuit conditions. In the adjustment of wide band intermediate frequency amplifiers, for instance, one image may show the amplifier output with increasing frequency in the right to left direction and the other image may show the amplifier output with decreasing frequency in the right to left direction. When these two images can be superimposed upon each other to produce a single image showing the center frequency at a common point, it is evident that the performance of the system with respect to frequency changes is symmetrical and deviations in frequency above the center frequency cause the same change in output as similar deviations below the center frequency.

Presentation of two images on a single cathode ray tube has been achieved by utilizing a sweep signal generator varying the frequency of signal applied to the amplifier uniformly between the two desired limits of operation. That is, from the lower frequency limit the frequency is uniformly increased until the upper frequency limit is reached at which time the frequency is uniformly decreased at the same rate until the lower frequency limit is reached. The output of the amplifier is detected and applied to the vertical deflecting plates of a cathode ray tube. A synchronized saw-tooth voltage wave is applied to the horizontal deflecting plates, the saw-tooth wave making one sweep while the frequency is being increased and a second sweep while the frequency is being decreased. Hence, two graphical response curves corresponding to opposite directions of frequency change are produced on the cathode ray tube screen.

While the above mentioned procedure has proven effective in practice, considerable difficulty has occurred due to the problem of exactly superimposing the two images. This results from the fact that the sweep voltages applied to the cathode ray tube and the frequency sweep applied to the amplifier are not exact saw-tooth waves but instead deviate therefrom to an extent determined by the circuit constants. Furthermore, synchronization of the saw-tooth waves by a source of half frequency causes the saw-tooth periods to differ in length. For these reasons it has been necessary to alter the central point of frequency sweep until the images coincide. This tends to offset the frequency sweep with respect to range over which information is desired, thereby causing operation in a non-linear portion of the range where calibration and measurement is difficult and where most of the available sweep is in a useless portion of the range. For this reason attempts to superimpose the images by altering the center frequency have not been satisfactory.

It is the object of my invention to provide means to alter at will the relative position of two images on a cathode ray tube screen.

It is a further object of my invention to alter the relative position of two images on a cathode ray tube screen in a uniform manner with respect to the center axis of the screen.

An additional object of my invention is to provide a simple and reliable means utilizing standard circuit components and having a high degree of reliability whereby the relative position of images on a cathode ray tube screen may be altered.

Still another object of my invention is to provide means for adjusting wave translation systems for equal response with respect to deviation of an input condition from a predetermined value and which inherently provides a simple and convenient method of superimposing two cathode ray tube images representing change of the input condition in opposite directions across the screen.

Briefly, in accordance with my invention, the relative position of two cathode ray tube images is adjusted by applying an adjustable constant voltage to the cathode ray tube deflecting plates while one image is being produced and a different constant voltage to the deflecting plates when the other image is being produced. By adjusting the values of these voltages, the relative positions of the two images can be varied at will, thereby permitting compensation for the normal errors inherent in the system.

In accordance with a further aspect of my invention the relative positions of two images on a cathode ray tube screen are altered with respect to each other but not with respect to the center of the screen by applying a substantially rectangular voltage wave to the tube deflection plates, this voltage being positive while one image is being produced and negative while the other is produced. This moves the images in opposite directions to an equal degree without distorting their shape or symmetry with respect to the center of the image screen.

My invention further resides in circuit combinations and arrangements whereby rectangular wave voltage of wave shape very nearly an exact rectangular wave and precisely synchronized with the normal sweep circuits is adjustably inserted into a cathode ray tube sweep circuit.

Figure 2:
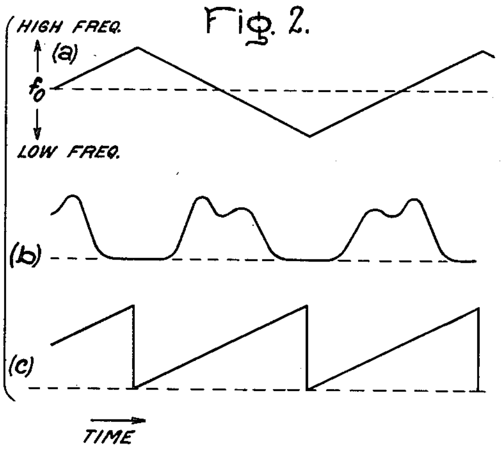
Figure 3:
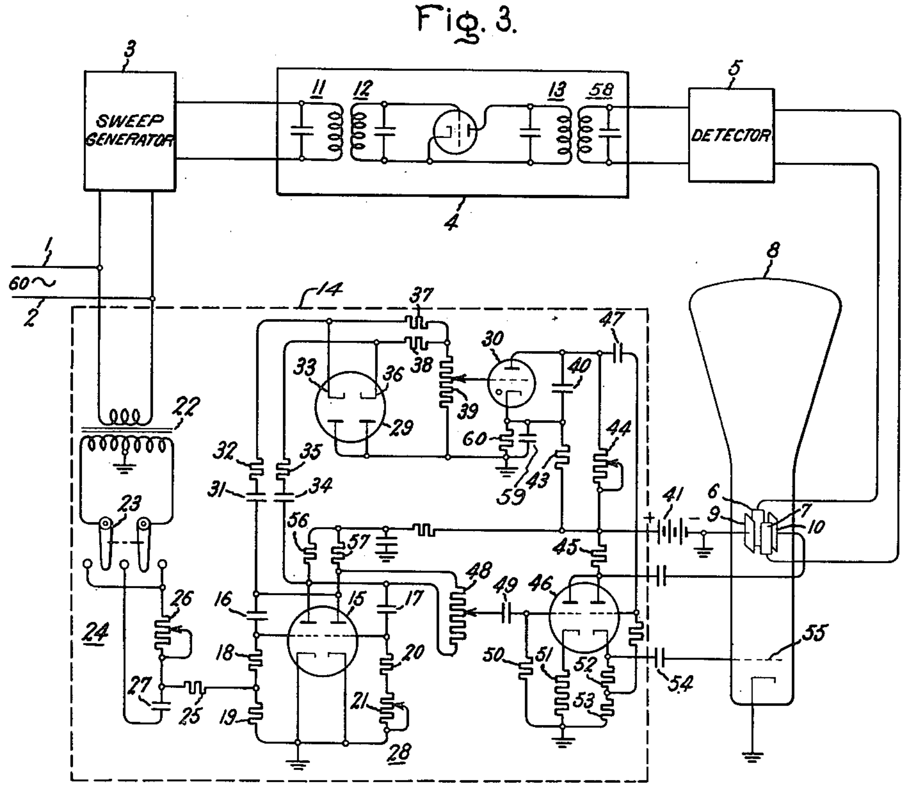
Figure 4:
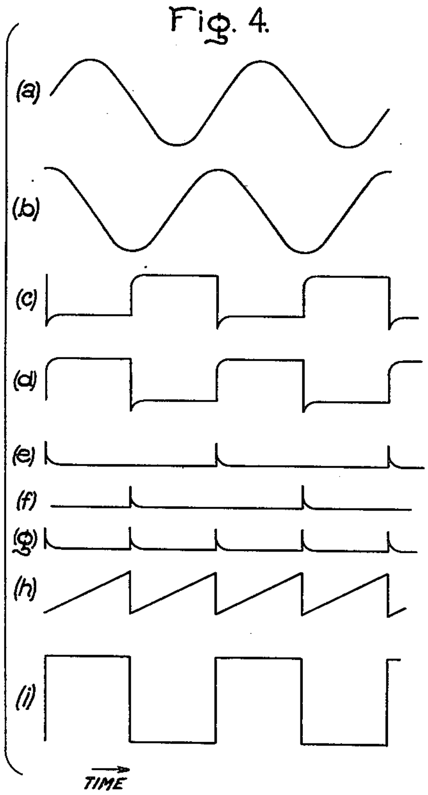
Figure 5:
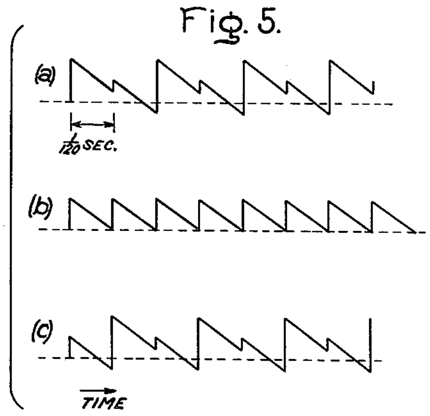
Figure 6:
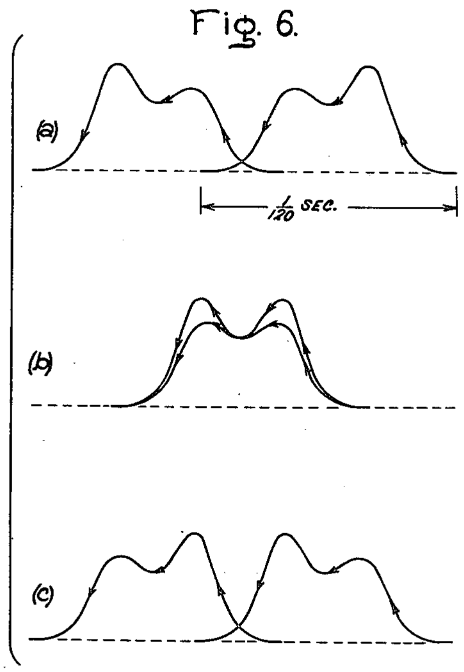

The novel features which I believe to be characteristic of my invention are set forth with particularity in the appended claims. My invention itself, however, both as to its organization and method of operation together with further objects and advantages thereof may best be understood by reference to the following description taken in connection with the accompanying drawings in which: Fig. 1 shows a block diagram of the principal elements of my invention as applied to the particular purpose of tuning an intermediate frequency amplifier; Fig. 2 shows the time-variation of frequency, time-variation of vertical cathode ray beam deflection voltage, and time-variation of horizontal cathode ray beam deflection voltage required for proper operation of my invention; Fig. 3 is a partial schematic diagram showing in detail the circuits used in an illustrative embodiment of my invention; Fig. 4 shows the time variation of voltage at various points within the embodiment of my invention shown in Fig. 3; Fig. 5 shows output wave forms corresponding to various adjustments of my invention; and Fig. 6 shows typical cathode ray tube images corresponding to the adjustments illustrated in Fig. 5.

In the block diagram shown in Fig. 1, numerals 1 and 2 represent input terminals for 60 cycle power. These terminals feed sweep generator 3 and sweep circuits 14. It is the function of the former unit to produce a constant amplitude voltage having substantially uniform frequency increase and decrease between the desired limits of operation and synchronized with the source voltage at terminals 1 and 2. Output voltage from sweep generator 3 is applied to the input terminals of unit 4 which represents the amplifier system to be adjusted. Signals from amplifier 4 are applied to detector 5 where they are converted to a voltage corresponding to their peak amplitude and from which they are applied to vertical deflection plates 6 and 7 of cathode ray tube 8. Sweep circuit 14 feeds horizontal deflection plates 9 and 10 of cathode ray tube 8 to produce the horizontal sweep required for presenting the desired images on cathode ray tube 8.

The operation of the system shown in Fig. 1 is illustrated by Fig. 2. The output signal from sweep generator 3 varies above and below a central frequency, $f_0$, as shown in curve (*a*), the variation comprising alternate periods of uniform frequency increase and uniform frequency decrease extending above and below the center frequency. These may be produced by using a mechanically rotated variable condenser, a reactance tube circuit, or similar system synchronized with the 60 cycle power supply. Output signals from amplifier 4 vary in accordance with the amplifier response as frequency changes. These signals are shown in Fig. 2 (*b*) for the particular case of an amplifier having a greater response peak above the center frequency than below the center frequency. From Fig. 2 (*b*) it is evident that the response curve corresponding to the frequency sweep of Fig. 2 (*a*) consists of two separate successively recurring wave shapes, one being the mirror image of the other. If a horizontal sweep voltage such as that shown in Fig. 2 (*c*) is applied to the cathode ray tube at the same time the vertical deflection is made to correspond with the signals shown in Fig. 2 (*b*) the two separate response curves will appear superimposed on the screen as shown in Fig. 1.

For purposes of illustration, the horizontal sweep voltage as shown in Fig. 2 (*c*) is an exact saw-tooth wave shape having perfectly linear voltage increase with time; the sweep frequency is exactly linear as shown in Fig. 2 (*a*); the two successive sweeps have identical periods; and the two sweep circuits are exactly synchronized. The wave shapes therefore produce perfectly superimposed images as shown in Fig. 1. However, it has been found impossible to achieve this degree of performance in practice due to unavoidable deviations from the conditions listed above. For example, the horizontal sweep voltage cannot be made an exact linear saw-tooth, for the RC circuits ordinarily used to generate the saw-tooth sweep actually produce an exponential voltage increase which can only be made to approximate a straight line over a portion of the characteristic. Similarly, the frequency sweep can only be made as uniform as practical condenser or reactance tube construction will permit. For these reasons, the actual performance which has been obtained utilizing systems such as shown in Fig. 1 is not that shown in Fig. 2 but departs therefrom. As a consequence of this departure, the two images usually do not correspond as shown in Fig. 1 but are displaced horizontally with respect to each other.

In order best to explain the principles of my invention, I will now refer to the specific embodiment shown in detail in Fig. 3. In this figure, numbers on the large blocks represent elements corresponding to those of Fig. 1. For purposes of illustration, however, the amplifier to be aligned, shown as unit 4, is illustrated schematically, having tuned circuits 11, 12, 13, and 58 which must be properly adjusted in order to secure optimum performance. In addition, the sweep circuits shown as unit 14, Fig. 1, are shown schematically.

Referring now to the specific schematic diagram of the sweep circuit shown as unit 14, the two sections of duplex triode tube 15 are connected as a multi-vibrator having a free-running frequency of slightly less than 60 cycles. This multi-vibrator circuit is conventional, the approximate natural frequency of oscillation being determined by the values of capacitances 16 and 17 and resistors 18, 19, 20 and 21. Resistance 21 is made variable so that the multi-vibrator may be balanced with respect to operation of the two sections of tube 15, thereby permitting adjustment of the system naturally to produce a symmetrical wave. Operation of the multi-vibrator is synchornized with respect to the 60 cycle voltage supply at terminals 1 and 2 by means of transformer 22, switch 23, phasing network 24, and resistance 25. These units cause a small 60 cycle voltage to be inserted into the grid circuit of one section of tube 15 and thereby cause the multi-vibrator to be triggered in accordance with the 60 cycle frequency. Phase shift network 24 comprises variable resistance 26 and capacitor 27. Variation in the value of resistance 26 permits a change in phase relationship of approximately 180 degrees between the voltage terminals 1 and 2 and the voltage applied to the multi-vibrator. Reversing switch 23 permits shifting this phase relation over an additional 180 degrees, thus providing an overall phase variation of approximately 360 degrees. It is well known that with the RC network shown, this voltage has a constant amplitude of one-half the applied voltage from the secondary winding of transformer 22 regardless of the setting of resistance 26 or switch 23 provided resistance 25 is very much larger in value than resistance 26.

Output voltage from multi-vibrator 28 is fed to two separate units. One of these, the saw-tooth generator, comprises tubes 29 and 30, and the circuits associated with them. Plate voltage from one section of duplex triode tube 15 is fed through the differentiating network comprising capacitor 31 and resistance 32 to cathode 33 of one section of duplex diode 29. Plate voltage from the other section of tube 15 is fed through the differentiating network comprising capacitor 34 and resistor 35 to the cathode 36 of the second section of diode 29. The two cathodes 33 and 36 of tube 29 are connected to a common point through resistors 37 and 38 and to the grid of tube 30 by means of potentiometer 39. Negative voltage pulses appearing at the cathodes of tube 29 produce no voltage thereacross because of the low impedance of that tube to such pulses. The purpose of this section of the circuit is to provide synchronized 120 cycle voltage pulses at the grid of tube 30 and its operation will be discussed in further detail below.

Tube 30 comprises a conventional saw-tooth wave generator adjusted for a natural frequency slightly less than 120 cycles. In this generator capacitor 40 is charged from source of positive potential 41 through resistances 43 and 44 and discharged through gas discharge tube 30. Inasmuch as the 120 cycle voltage pulses appearing at the grid of tube 30 are of magnitude sufficient to trigger that tube, the voltage appearing across the condenser 40 is reduced to zero 120 times a second. Resistances 43 and 44 are adjusted to cause the voltage across condenser 40 to reach the desired peak potential between successive cycle pulses so that a saw-tooth voltage of the desired magnitude is developed across condenser 40. This voltage is fed to one section of duplex triode 46 through condenser 47.

Duplex triode 46 is connected by potentiometer 48, condenser 49 and resistance 50 to the square wave output voltage from multi-vibrator 28. This voltage, appearing at the second section of tube 46 causes plate current flow through resistance 45 which produces a square wave voltage having frequency corresponding to the operation of multi-vibrator 28 and which appears across deflecting plates 9 and 10 of cathode ray tube 8. The magnitude of this voltage is controlled by the setting of the tap on resistance 48 with respect to its center position and its phase, or polarity, with relation to the operation of multi-vibrator 28, is established by the direction of the setting of the tap on potentiometer 48 relative to its center position. Inasmuch as one section of tube 46 receives grid voltage from the 120 cycle saw-tooth wave generated by tube 30 and the other section receives rectangular wave grid voltage from 60 cycle multi-vibrator 28, the total current flow through resistance 45 produces a combined voltage across resistance 45 which is the sum of these two waves.

Cathode resistances 51, 52 and 53 provide cathode bias for the two sections of tube 46 in the conventional manner. In addition, condenser 54 connects grid 55 of cathode ray tube 8 to the cathode of the section of tube 46 having the 120 cycle saw-tooth applied voltage thereby blanking of that tube on the return sweep. In general, I prefer to have the section of tube 46 which carries the rectangular wave biased almost to cut-off by the direct voltage appearing across resistance 51. This eliminates the characteristic saw-tooth spikes appearing at the leading edge of the negative half-cycle of the multivibrator.

Operation of the embodiment of my invention shown in Fig. 3 is illustrated by the curves of Fig. 4 which show voltages appearing within the circuits of Fig. 3 at corresponding instants of time. In Fig. 4, curve (*a*) shows the 60 cycle input voltage applied to terminals 1 and 2 and curve (*b*) shows this voltage as delayed by phasing network 24 and applied to multivibrator 28. Inasmuch as the latter voltage synchronizes multi-vibrator 28, the output of that unit comprises a rectangular wave which changes from one condition to the other at the positive and negative peaks thereof. Curve (*c*) shows the resulting current flow in one section of tube 15, and hence the voltage drop across resistance 56, Fig. 3. Curve (*d*) shows the current flow in the second section of tube 15 and the voltage drop across resistance 57, Fig. 3. These two waves deviate from a pure rectangular wave to a slight degree characteristic of the operation of a multivibrator. The effect of capacitor 34 and resistance 35 is to differentiate the voltage across resistance 56, thus applying alternate positive and negative voltage pulses at cathode 36 and tube 29. The negative voltage pulses appearing at cathode 36 of tube 29 find a low impedance path to ground through the tube and therefore do not appear as voltage at the cathode whereas the positive pulses, modified in magnitude by resistance 38 and potentiometer 39, appear at the grid of tube 30. The resulting wave is shown at Fig. 4 (*e*). Similarly, capacitor 31 and resistance 32 act to differentiate the voltage across resistance 57 thereby causing alterante positive and negative voltage pulses to appear at the cathode 33 of tube 29. Negative pulses are shorted to ground by tube 29 whereas positive pulses pass through resistance 37 and potentiometer 39 to reach the grid of tube 30. The resulting wave is shown at Fig. 4 (*f*). The shape of the voltage across resistance 39 comprises the combined positive components of the voltages appearing at cathodes 33 and 36 of tube 29. This voltage is shown at Fig. 4 (*g*) and comprises 120 positive voltage pulses a second synchronized with the multi-vibrator operation. Inasmuch as these pulses are of magnitude sufficient to trigger tube 30, the voltage across condenser 40 comprises a 120 cycle saw-tooth wave as shown in Fig. 4 (*h*). This voltage appears at the grid of one section of tube 46, thereby producing a 120 cycle saw-tooth voltage drop across resistance 45. The voltage appearing across resistance 48 is equal to the difference voltage between one anode of tube 15 and the other anode. Inasmuch as the voltage at one anode is that represented by curve (*c*), Fig. 4, and the voltage at the other anode is represented by the curve (*d*), Fig. 4, the difference voltage is as shown in curve (*i*), Fig. 4. The section of tube 46 to which potentiometer 48 and condenser 49 are connected is biased almost to cut-off by direct voltage appearing across cathode resistance 51, which resistance is of a comparatively high value. This serves to eliminate the voltage peaks appearing in curves (*c*) and (*d*), Fig. 4, to produce a nearly perfect square wave as shown in Fig. 4 (*i*). The current flow in one section of tube 46, is, therefore, a square wave and a square wave voltage drop appears across resistance 45.

From the above description it is evident that the voltage appearing across resistance 45, and hence the sweep voltage at horizontal deflection plates 9 and 10, consists of a 120 cycle saw-tooth wave pulse and a 60 cycle rectangular wave; the two voltages being synchronized so that a saw-tooth wave is generated each time the rectangular wave changes from one condition to another. The relative magnitude of these two voltages, however, may be changed by adjustment of potentiometer 48 to give a variety of output wave forms. Some of these wave forms, selected for purposes of illustration, are shown in Fig. 5 and the resulting cathode ray tube images shown in Fig. 6. The latter curves are based on the same amplifier response curve as is shown in Fig. 2.

In Fig. 5 (*a*) the rectangular wave voltage is one-third the value of the saw-tooth voltage, the rectangular wave being positive for the first saw-tooth cycle shown. In this case, the cathode ray beam passes uniformly over one portion of the screen for one frequency sweep and then jumps to a second position on the screen where it uniformly sweeps for the reverse frequency sweep. The resulting image, shown in Fig. 6 (*a*), comprises two response curves separated horizontally, with overlap equal to one-third the horizontal distance covered in one sweep. Fig. 5 (*b*) shows the wave shape appearing at sweep plates 9 and 10, Fig. 3, when the magnitude of the rectangular wave voltage is adjusted by potentiometer 48 to be zero. In this case, the two frequency sweeps are superimposed as shown in Fig. 6 (*b*). In Fig. 5 (*c*) the polarity of the square wave is reversed with respect to that shown in Fig. 5 (*a*), but the relation of magnitudes is preserved. This produces overlapping images corresponding to the two frequency sweeps but in reverse order as compared to those obtained with the sweep of Fig. 5 (*a*). This is shown as Fig. 6 (*c*).

It will be noted from Fig. 6 that for the successive sweep adjustments discussed above the two images are progressively changed in their relative positions in going from Fig. 6 (*a*) to Fig. 6 (*c*), the change being accomplished by altering the value of rectangular wave voltage applied to the tube. It will be further noted that the adjustment is symmetrical with respect to the center of the tube screen. Hence, it is possible to provide any desired degree of horizontal displacement between the images by controlling the rectangular wave voltage.

In the use of this system for alignment of amplifiers, for instance, just enough square wave voltage is inserted to compensate for the inherent errors in the system caused by failure to realize a perfect saw-tooth, synchronizing errors, etc. It is evident, therefore, that I have achieved a means of eliminating the effects of these errors and have thereby avoided the difficulties that have been previously inherent in this type of image presentation.

In one embodiment of my invention which I have found to operate in a satisfactory manner, the following circuit constants were used:

15, type 6SL7-GT tube
16, 0.003 microfarad
17, 0.003 microfarad
18, 1.2 megohms
19, 0.25 megohm
20, 0.75 megohm
21, 1 megohm
22, 6.3 volts output
25, 1.25 megohms
26, 200,000 ohms
27, 0.5 microfarad
29, type 6H6 tube
30, type 884 tube
31, 250 micromicrofarads
32, 5 megohms
34, 250 micromicrofarads
35, 5 megohms
37, 0.25 megohm
38, 0.25 megohm
39, 0.2 megohm
40, 0.1 microfarad
41, 200 volts
43, 62,000 ohms
44, 1.3 megohms
45, 10,000 ohms
46, type 6SN7-GT tube
47, 0.1 microfarad
48, 2 megohms
49, 0.1 microfarad
50, 1 megohm
51, 50,000 ohms
52, 2000 ohms
53, 25,000 ohms
54, 500 micromicrofarads
56, 22,000 ohms
57, 22,000 ohms
59, 25 microfarads
60, 1000 ohms It will be understood that the above discussed circuit performances are simplified for purposes of illustration and discussion. In particular, the saw-tooth and square waves have been shown as being perfect whereas in actual circuits such perfect waves cannot practically be produced. Inasmuch as these changes influence only the position of the cathode ray tube beam for a particular set of conditions and do not alter the ability of the operator to change the relative position of the two images, they are of no consequence in the operation of my invention. It will be understood, however, that I do not propose to imply that actual circuit conditions are exactly as shown in the figures but on the contrary have shown the circuit conditions in a manner to achieve the maximum degree of clearness in my specification.

While I have shown and described my invention as applied to a particular system of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent in the United States is:

1. In combination, a cathode ray device having a viewing screen and two coordinate ray deflecting elements disposed to deflect the ray along two axes normal to each other, means to apply a saw-tooth sweep voltage to one of said elements, means to apply signal voltage to the other of said elements, said signal voltage alternately representing two signals, one of said signals during one set of alternate saw-tooth voltage sweeps and the other of said signals during the other set of alternate saw-tooth voltage sweeps, thereby to produce a separate image corresponding to each signal, means to apply a flat-topped voltage wave to said first mentioned element, said flat-topped wave having one value for one group of alternate saw-tooth sweeps and a second value for the other group of alternate saw-tooth sweeps, and means to alter the value of said flat-topped wave thereby to alter the relative positions of said two images.

2. In combination, a cathode ray device having a viewing screen and two coordinate ray deflecting elements disposed to deflect the ray along two axes normal to each other, means to apply a saw-tooth sweep voltage to one of said elements, means to apply signal voltage to the other of said elements, said signal voltage alternately representing two signals, one of said signals during one set of alternate saw-tooth voltage sweeps and the other of said signals during the other set of alternate saw-tooth voltage sweeps, thereby to produce a separate image corresponding to each signal, means to apply a rectangular voltage wave to said first mentioned element, said rectangular wave having one value for one group of alternate saw-tooth sweeps and the same value but opposite polarity for the other group of alternate saw-tooth sweeps, and means to alter the value of said rectangular wave thereby to alter simultaneously the positions of said two images with respect to the axis of said first mentioned element.

3. In combination, a cathode ray device having at least one pair of ray deflecting electrodes, a resistance connecting said electrodes, two electron discharge devices each having an anode, a cathode and a control electrode, means connecting one of said deflecting electrodes to the anodes of said electron discharge devices, a source of unidirectional electromotive force, means connecting the positive terminal of said source to the other of said deflecting electrodes, means connecting the negative terminal of said source to the cathodes of said electron discharge devices, means to apply a saw-tooth voltage wave between the cathode and control electrode of one of said discharge devices, means to apply a flat-topped voltage wave between the cathode and control electrode of the other of said devices, said flat-topped voltage wave having one value for one group of alternate saw-tooth cycles and another value for the other group of alternate saw-tooth cycles.

4. In an oscillographic system for analyzing the frequency response characteristics of a transmission circuit, said system being of the type comprising a cathode ray device having a sensitive viewing screen and first and second coordinate ray deflecting elements, a source of oscillations connected to said circuit, means for detecting the envelope of said oscillations after transmission through said circuit and means for energizing said first element therewith, the combination therewith of control means for cyclically varying the frequency of said source at a predetermined frequency, a square wave generator synchronized from said control means in predetermined phase relation and generating an alternating square wave of the same predetermined frequency, a sweep wave generator synchronized with said square wave generator and operating at twice said frequency, alternate cycles of the sweep wave occurring during half-cycles of the square wave of one polarity and amplitude and intermediate cycles of the sweep wave occurring during half-cycles of the square wave of opposite polarity and of the same amplitude, and means for impressing both said waves on said second deflecting element, whereby two displaced images appear on said screen representative of the frequency response characteristics of said circuit during increasing and decreasing frequency variations of said source respectively.

5. In an oscillographic system for analyzing the frequency response characteristics of a transmission circuit, said system being of the type comprising a cathode ray device having a sensitive viewing screen and vertical and horizontal ray deflecting elements, a source of oscillations connected to said circuit, means for detecting the envelope of said oscillations after transmission through said circuit and means for energizing said vertical element therewith, the combination therewith of control means for cyclically varying the frequency of said source at a predetermined frequency, a square wave generator synchronized from said control means in predetermined phase relation and generating an alternating square wave of the same predetermined frequency, a sawtooth wave generator synchronized with said square wave generator and operating at twice said frequency, alternate cycles of the sawtooth wave occurring during half-cycles of the square wave of one polarity and amplitude and intermediate cycles of the sawtooth wave occurring during half-cycles of the square wave of opposite polarity and of the same amplitude, means for impressing both said waves on said horizontal deflecting element, whereby two horizontally-displaced images appear on said screen representative of the frequency response characteristics of said circuit during increasing and decreasing frequency variations of said source respectively, and means for independently varying the amplitude and polarity of said alternating square wave, thereby to vary the direction and extent of the displacement of said images along the horizontal axis.

DONALD E. MAXWELL.

REFERENCES CITED

The following references are of record in the file of this patent:

UNITED STATES PATENTS

| Number | Name | Date |
|---|---|---|
| 1,936,796 | Legg | Nov. 28, 1933 |
| 2,130,032 | Robbins | Sept. 13, 1938 |
| 2,189,457 | Archer | Feb. 6, 1940 |
| 2,203,750 | Sherman | June 11, 1940 |
| 2,243,234 | Von Duhn | May 27, 1941 |
| 2,282,895 | Shepard, Jr. | May 12, 1942 |
| 2,356,510 | Beserno | Aug. 22, 1944 |
| 2,420,516 | Dischoff | May 13, 1947 |
| 2,435,207 | Dimond | Feb. 3, 1948 |